March 25, 1930.    M. W. BEEMER    1,751,572
ELECTRICAL CONNECTER
Filed June 23, 1926
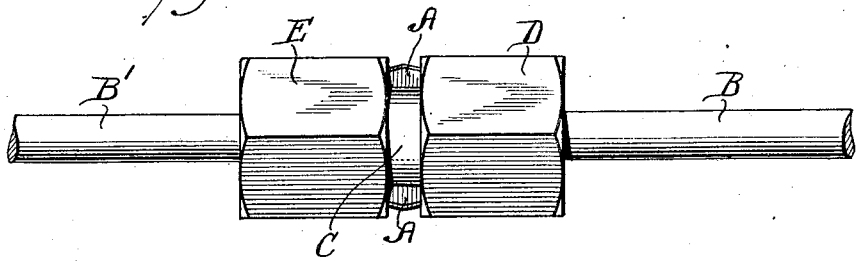
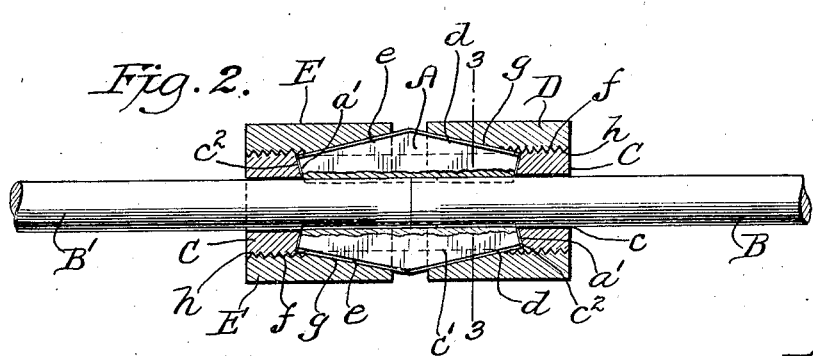
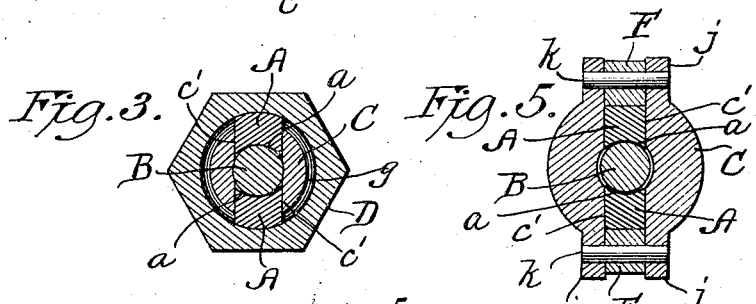 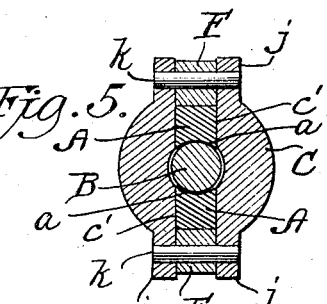
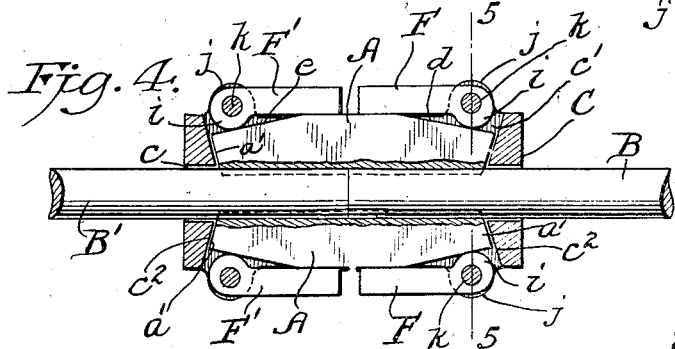
Inventor
Miles W. Beemer
By his Attorney Patented Mar. 25, 1930

1,751,572

UNITED STATES PATENT OFFICE

MILES W. BEEMER, OF NEWARK, NEW JERSEY

ELECTRICAL CONNECTER

Application filed June 23, 1926. Serial No. 117,902.

My invention is a connecter for electrical conductors wherein a direct path for the flow of current from one conductor to another conductor is provided by the use of bridge members positioned for spanning the gap intermediate the adjacent ends of two conductors.

The bridge members are in electrical contact directly with the two conductors, and each of a plurality of said bridge members is confined in engagement tightly with the two conductors by the use of appropriate clamping means of one form or another.

In this art a demand exists for a connecter which is capable of assemblage quickly by an ordinary workman, and which at the same time is efficient in coupling the conductors, and which, moreover, is economical of production.

My invention fulfills the various requirements of the trade for a device of this character. It is embodied in various constructional forms, each of which includes the element of a plurality of bridge members having electrical contact directly with the conductors and spanning the gap which may exist between the proximate ends of said conductors. Said bridge members are retained in position by a member acting primarily as a cage, and with this member and the bridge members co-operates certain clamping or pressure-applying elements, whereby the bridge members are forcibly applied to the conductors.

My invention is embodied, also, as a branch connecter, whereby a branch conductor is coupled efficiently to and associated with a main or feeder conductor to provide for the flow of current from the feeder into the branch.

Other functions and advantages of the invention will appear from the following description taken in connection with the drawings, wherein—

Figure 1 is a side elevation of a connecter embodying one form of my invention.

Figure 2 is a longitudinal section with the two conductors in elevation.

Figure 3 is a cross section on the line 3—3 of Figure 2.

Figure 4 is a longitudinal section of another constructional form of my connecter, and Figure 5 is a cross section on the line 5—5 of Figure 4.

In the constructional form shown in Figures 1, 2 and 3, the bridge bars A span any gap as may exist between the proximate ends of the conductors B, B', to be connected, said bridge bars being continuous between and in direct electrical connection with said conductors and each of the same. A desired number of bridge bars are used, two being shown, although the number is not material. Each bridge bar is an unbroken and continuous piece of current-conducting metal, and each bar is shaped on the inner edge or face to conform to the contour of the conductor, it being preferred to impart a concave bearing face $a$ to the bar, see Figure 3.

For holding the plurality of bridge bars in position, I employ a cage in the form of a sleeve C, the same being provided with an axial passage $c$, and with a plurality of radial slots $c'$, the end walls $c^2$ of which are beveled. The conductors B, B', enter the axial opening $c$ to a desired extent, but it is not essential that the ends of said conductors shall abut or contact one with the other, whereby the workman is not required to assemble the connecter with extreme care or accuracy.

The bridge bars A are positioned within the radial slots $c'$ of the sleeve for the inner concave faces $a$ of said bars to have close physical contact with the conductors B, B'. It is preferred to provide bevels $a'$ on the end faces of the bars A, said beveled faces $a'$ being adapted for contact with the beveled end walls $c^2$ of the slots in the sleeve C, whereby the entry of the bars into the slotted sleeve is limited and arrested by the contacting engagement between the beveled ends $a'$ of the bars with the beveled walls $c^2$ at the ends of the slots $c'$.

Appropriate means are provided for the application of force to the bridge bars whereby they are pressed and held into tight engagement with the conductors. As shown, each bar is in the form of a double wedge by providing the outer edge portion with bevels $d$, $e$, extending in oppositely inclined directions to each other. With said bars are associated the compressing nuts D, E, each of which is formed with a female thread, $f$, for a part of its length, and with a smooth flaring opening, $g$, for the remainder of the length. The end portions of the sleeve C are formed with male threads, $h$, and on such threaded parts $h$ of the sleeve are screwed the nuts D, E, the smooth flaring faces, $g$, of which are in engagement with the inclined faces $d$, $e$, of the bars A. By turning the nuts into tight engagement with the beveled faces of the bars a wedging action is obtained between the nuts and the bars, and thus the movement of said nuts D, E, act to force the bars A inwardly with respect to the sleeve C, and into the required engagement with conductors B, B'.

In the manufacture of the connecter, it is preferred to use copper for the bridge bars, and to use brass for the sleeve and the rotary nuts; but obviously other materials suitable for the purpose may be employed, although copper bridge bars have been found by test to give the most satisfactory service owing to the high current-conducting capacity of such copper material.

The constructional form of connecter illustrated in Figures 4 and 5 embodies the elements of the sleeve C with axial opening $c$, and radial slots $c'$ having beveled walls $c^2$, with which sleeve co-operates a plurality of copper bridge bars A having concave inner faces $a$, and beveled end faces $a'$, together with inclined outer faces $d$, $e$, all as hereinbefore described, but in lieu of the rotary nuts D, E, and the threads, $h$, on the ends of the sleeve, I provide cam levers F, F', for applying the force required for securing the described tight engagement between the bridge bars and the conductors. As shown, each lever F or F' is formed with an enlargement $i$, the face of which constitutes a cam adapted for contact with one of the beveled faces $d$ or $e$ of a bar A. Said lever is fitted between lugs or ears $j$, provided exteriorly on the sleeve C, and said lever is pivoted to the sleeve by a pin $k$ passing through the ears and the cam formed enlargement $i$ of the lever. A number of levers F, F', are provided on the sleeve, two levers for each bridge bar, said two levers being positioned for contact with the appropriate bridge bar near the respective ends thereof.

The method of connecting the conductors by a connecter of my invention will be readily understood. The respective end portions of the conductors B, B', are thrust into the ends of the sleeve, C, and the nuts D, E, of Figures 1, 2 and 3 are screwed on the sleeve, or the cam levers F, F', of Figures 4 and 5, are turned on their pivots, the effect of which is to apply pressure to the bars A, at or near the ends thereof, and thus the bars A are pressed forcibly into contact with the proximate end portions of said conductors B, B'. The operation of assembling and tightening the connecter may be performed quickly, easily and by unskilled labor, but the device is efficient in service notwithstanding its apparent simplicity in construction.

An important feature is the utility of the bridge bars A in affording a path for the flow of current from one conductor through said bridge bars to the other conductor, without diverting the current flow through either the sleeve C or the nuts D, E, or their equivalents, the cam levers F, F'. My construction provides for the assembly of the conductors and the connecter without making it necessary for the workman to exercise the precaution of having the ends of the conductors B, B', in positive mechanical or electrical contact, and thus the conductors may be separated to a greater or less extent between their proximate ends without resulting in a disruptive spark on the establishing of a current flow, for the reason that the bars A bridge the gap and constitute a path for the flow of the current.

Obviously, the proximate ends of conductors B, B', should be in electrical and mechanical contact, but if they are not, then the presence of a gap is not fatal.

Again, should a space exist between the ends of the conductors, or should an arc or "corona" be established by the current flow, the gases so evolved by the arc are free to escape from the connecter, for the reason that the conductors B, B', have a relatively loose fit within the sleeve C, thus making provision for the leakage of such gases.

It is to be noted that the bars A are pressed by a wedging force into tight frictional engagement with the conductors, and thus the connecter serves as an efficient means for mechanically coupling or uniting the conductors, as well as providing a desirable electrical connection between the two conductors.

The form of the several parts will be such as to facilitate the service of the device. Thus, in the construction of Figures 1 and 3, the nuts externally will be hexagonal to enable the proper tools to be used for screwing the nuts inwardly upon the sleeve and into engagement with the bridge bars.

My invention is useful, also, in providing for the attachment of a branch conductor to the connecter in a way to feed current from the feeder conductor to the branch conductor.

Having thus fully described the invention, what I claim as new and desire to secure by Letters Patent is:

1. In an electrical connection, the combination of a threaded sleeve provided with a plurality of longitudinal slots, a plurality of conductors encased by the sleeve, a plurality of current-conducting bars each seated in one of the slots of said sleeve, each of said bars having electrical contact with the proximate ends of said conductors and each bar extending continuously from its contact with one conductor to its contact with the other conductor, and pressure applying nuts screwed on the threaded sleeve and having wedging contact with said current conducting members for applying pressure to the latter for clamping said members into electrical and tight frictional engagement with said conductors.

2. An electrical connecter embodying a sleeve provided with a plurality of slots the ends of which are beveled, a plurality of bridge members occupying said slots of the sleeve, each bridge member having beveled ends opposing the corresponding bevels of the sleeve, and movable means carried by the sleeve and contacting with the bridge members for applying pressure thereto, said movable means being operable relatively to the sleeve and operating by such movement to effect a clamping engagement of the bridge members upon a plurality of conductors.

In testimony whereof I have hereto signed my name this 21st day of June, 1926.

MILES W. BEEMER.